March 6, 1956  G. M. MARR  2,737,203
BREATHER AND DRAINAGE VALVES FOR WATERTIGHT ENCLOSURES
Filed April 7, 1954
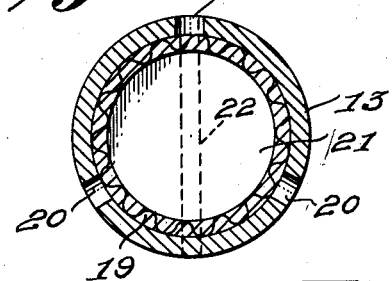
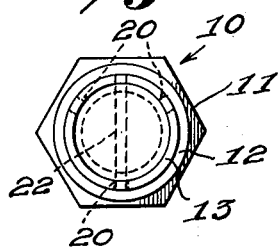
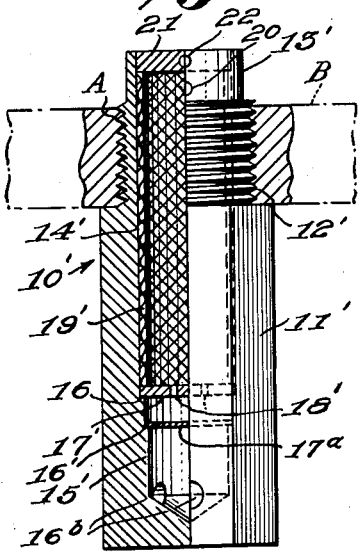
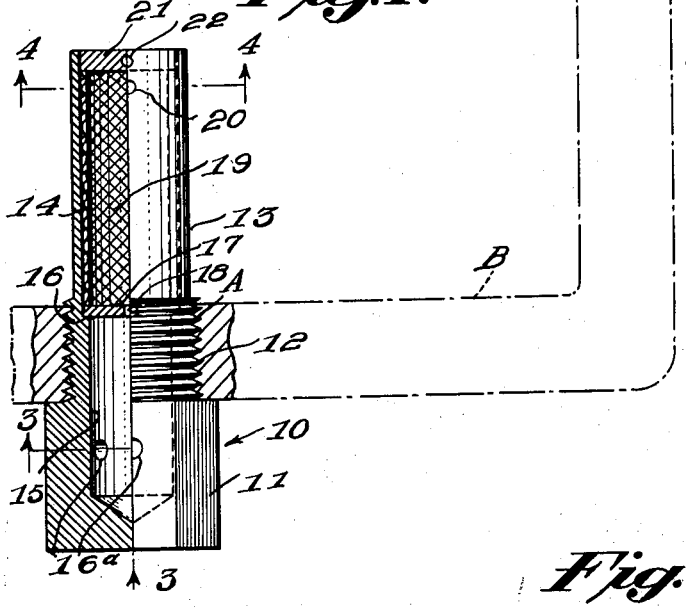
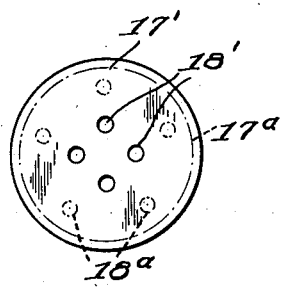
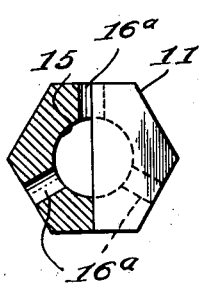
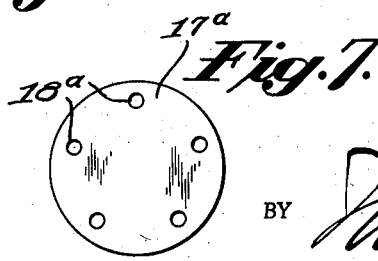
INVENTOR
George M. Marr
BY
ATTORNEY United States Patent Office 2,737,203
Patented Mar. 6, 1956

2,737,203

BREATHER AND DRAINAGE VALVES FOR WATERTIGHT ENCLOSURES

George M. Marr, New York, N. Y.

Application April 7, 1954, Serial No. 421,652

4 Claims. (Cl. 137—519)

This invention relates to breather and drainage valves for watertight enclosures.

As is generally known, water-tight boxes are subject to internal dampness which is caused by expansion and contraction of the air therewithin due to changes in the ambient temperatures.

This is especially true on ship board where the boxes are subject to rapid changes in temperatures and moisture conditions and are occasionally submerged in or splashed by waves in heavy seas.

The above noted condition is particularly objectionable in switch or other electrical control boxes wherein the switches or other electrical controls are shorted or grounded upon the condensate rising in the boxes to the level of such switches or other electrical controls.

Furthermore such condition causes rust and corrosion of delicate mechanisms, and on instruments provided with visual dials, the glass lenses frequently become fogged with the result that the dial readings are obscured.

The aforesaid condition has heretofore caused considerable concern with both manufacturers and users of electrical boxes and as an initial effort to overcome such condition, desiccators or dehydrators were used, and each of which consisted of a cartridge-type unit open at one end and filled with silica-gel.

Such units however, had to replaced at regular and frequent intervals for the reason that the point of complete moisture absorption of the silica-gel was reached in a relatively short time, thereby requiring a constant replenishment of the units which not only required time but kept an attendant constantly on the alert lest the box might become shorted or otherwise damaged.

The above noted objections to the desiccators or dehydrators having been recognized, resort was had to a drainage plug which was screw threaded into the box at a low point thereof, and which of course had to be removed at regular and relatively short intervals for drainage of the condensate from the box.

The drainage plug failed to provide a satisfactory solution since it required substantially the same time and alertness as the desiccator or dehydrator above referred to.

It is accordingly, a primary object of the invention to provide a unit removably insertable through a wall of an electrical output box and which automatically eliminates the above noted condition.

A further and more specific object of the invention is to provide a breather valve for removable insertion through a wall of an electrical output box and which is operative to offset the ambient temperature and thereby substantially avoid condensation within the box.

A still further object of the invention is to provide a combined breather and drainage valve for removable insertion through a wall of an electrical output box and which functions as above and further provides for drainage of any free water not avoided by the breathing operation, or that may have accumulated by seepage through or around gaskets or packing glands surrounding projecting shafts of operating handles.

A still further object of the invention is to provide a combined breather and drainage valve for the purpose above set forth wherein provision is made for preventing water from entering the valve under conditions of immersion thereof in water.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

Figure 1 is a half elevational and half axial vertical sectional view of one embodiment of the invention, a box being fragmentally indicated in broken and solid lines to show the application of the invention;

Figure 2 is a top plan view of the structure shown in Figure 1;

Figure 3 is a half bottom plan and half horizontal section on line 3—3 of the structure shown in Figure 1;

Figure 4 is an enlarged transverse sectional view as observed in the plane of line 4—4 on Figure 1;

Figure 5 is an enlarged plan view of a disk embodied in the invention as disclosed in Figure 6;

Figure 6 is a view corresponding to Figure 1 but showing a preferred embodiment of the invention, and Figure 7 is a plan view of a second disk embodied in the preferred structural embodiment of Figure 6.

Referring now in detail to the drawing, and first to Figures 1 to 5 thereof, an elongated valve body is indicated at 10. The body 10 includes a polygonal wrench engageable head 11, a cylindrical externally threaded portion 12 and a cylindrical portion 13 of less diameter than the threaded portion.

The body 10 is provided with a cylindrically walled recess including concentric portions 14 and 15, the former of which opens through the free end of the cylindrical portion 13 and the latter of which extends into the polygonal head 11.

The recess portion 14 is of slightly greater diameter than the recess portion 15 and a transverse shoulder 16 is provided at the junction of the two recess portions.

A disk 17 is disposed within the recess with its margin resting upon the said shoulder 16 and the disk is provided with a central aperture 18 which is coaxial with the recess and the body 10.

A cylindrical filter 19 is disposed within the recess and whose lower end rests upon the disk 17.

It is to be observed that the filter 19 is of a thickness equal to the width of shoulder 16 whereby a recess of uniform diameter extends from the free end of cylindrical portion 13 to the bottom of the recess portion 15 in the head 11.

The filter 19 is preferably formed of copper wool fabric which is silver plated and the function of the filter is to restrain the passage of foreign matter and outside moisture from admission to the interior of the box.

While other materials may prove effective in the filter, it has been found that copper wool is particularly desirable for the reason that it does not swell when wet which condition would impede the passage of air therethrough.

The cylindrical portion 13 is provided with a plurality (preferably three) of apertures 20 opening laterally through its wall adjacent the free end thereof and which apertures are screened by the filter 19 as is most clearly indicated in Figure 4.

A second disk 21 is disposed within the free end of the cylindrical portion 13 and has its margin resting upon the adjacent end of the filter 19 and the disk is preferably retained in position by means of a pin 22 extending through a diametrical aperture in the disk and aligned apertures in the wall of the cylindrical portion 13.

The head 11 is provided with a plurality (preferably three) of apertures 16a and which as indicated in Figure 1 are disposed substantially above the bottom of the recess portion 15.

The body 10 is supported in the bottom wall of a box B as by threading the portion 12 into a threaded aperture A which may well be the one heretofore utilized by the above referred to drainage plugs.

With the structure thus assembled, as indicated in Figure 1, the tubular portion 13 projects well up within the box with the apertures 20 disposed a substantial distance above the bottom of the box.

The structure thus mounted provides for circulation of air through the apertures 16a, 18 and 20 whereby the formation of condensate is substantially wholly avoided.

This structure is in fact a breather and the filter 19 prevents the admission of external moisture and foreign particles into the box B.

The modified and preferred structure illustrated in Figure 6 is generally similar to that of Figure 1 and in fact embodies corresponding elements but which are disposed in different relative positions whereby such structure is adapted to function both as an air breather and a free water drain.

This preferred structure embodies a body 10' which is substantially of the same overall length as the body 10 but wherein the wrench engageable head 11' is of substantial length, the cylindrical portion 13' is of relatively short length and the threaded portion 12' corresponds to the threaded portion 12 in Figure 1.

In this modified structure the same disk 21 is utilized but the cylindrical filter 19' is of a greater length than the filter 19 in Figure 1 and a modified disk 17' is disposed nearer the bottom of the recess 15' due to the provision of a longer recess portion 14'.

In this modified and preferred embodiment of the invention the disk 17' is preferably provided with a plurality of apertures 18' as distinguished from the single aperture 18 in the disk 17 of Figure 1.

The preferred embodiment of the invention further includes a third disk 17a whose margin is freely supported on a shoulder 16' beneath the shoulder 16 and the disk 17a is provided with a plurality of apertures 18a.

The disk 17' is of relatively heavy metal and is held on shoulder 16 by the filter 19 as is the disk 17 in Figure 1. The apertures 18' in disk 17' are arranged circumferentially of the axis thereof and relatively close thereto.

The apertures 18a in disk 17a are also arranged circumferentially but are disposed adjacent the perimeter thereof whereby apertures 18' and 18a are not vertically aligned as is obvious from Figure 5 wherein the disk 17a and apertures 18a therein are shown in dot-and-dash lines.

With the disks 17' and 17a in their normal positions of Figure 6 clear water drawing passage is provided as through apertures 20, 18', 18a and 16b.

The disk 17a is of light weight non-hygroscopic material and since it normally rests on shoulder 16' by its weight only, water entering apertures 16b will raise same upwardly into contact with disk 17' and in which position the apertures 18' and 18a will be closed as indicated in Figure 5 whereby water will be effectively prevented from entering the box B.

The improved valve is in fact one which permits two way passage of air but one way only passage of water.

It is to be particularly observed that in this preferred structural embodiment of the invention the apertures 20 are disposed close to the bottom of the box B and the portion 11' is provided with apertures 16b which are close to the bottom of the recess portion 15' whereby provision is made for drainage of free water from the box B as well as for air circulation as in the embodiment of Figure 1.

While I have disclosed my invention in accordance with certain specific structural embodiments thereof, such are to be considered as illustrative only and not restrictive, the scope of the invention being defined in the subjoined claims.

What I claim and desire to secure by U. S. Letters Patent is:

1. A breather and drainage valve for watertight enclosures, comprising an elongated body member including an intermediate externally threaded portion for engagement within a threaded aperture in the wall of a water-tight box, a polygonal wrench engageable portion at one end of the body member for disposition externally of the box, and a cylindrical portion for disposition within the box, said body member being provided with a cylindrical walled recess opening through the free end of said cylindrical portion and terminating in said polygonal portion, said polygonal portion having transversely disposed apertures in communication with said recess and for communication with the atmosphere, said cylindrical portion having transversely disposed apertures in communication with said recess and for communication with the interior of said box, a first disk closing the opened end of said recess beyond the apertures in said cylindrical portion, a second disk disposed within said recess and having a plurality of apertures, a cylindrical filter disposed within said recess leaving its opposite ends engaged with said first and second disks in spanning relation to said apertures in said cylindrical portion, and a third disk disposed within said recess below and normally in spaced relation to said second disk, said third disk being provided with a plurality of apertures and being movable within the recess to a position in contact with said second disk under pressure of water entering said recess through said apertures in said polygonal portion.

2. A breather and drainage valve for watertight enclosures, comprising an elongated body member including an intermediate externally threaded portion for engagement within a threaded aperture in the wall of a water-tight box, a polygonal wrench engageable portion at one end of the body member for disposition externally of the box, and a cylindrical portion for disposition within the box, said body member being provided with a cylindrical walled recess opening through the free end of said cylindrical portion and terminating in said polygonal portion, said polygonal portion having transversely disposed apertures in communication with said recess and for communication with the atmosphere, said cylindrical portion having transversely disposed apertures in communication with said recess and for communication with the interior of said box, a first disk closing the opened end of said recess beyond the apertures in said cylindrical portion, a second disk disposed within said recess and having at least one aperture therethrough, a filter disposed within said recess between the apertures in said cylindrical portion and in said second disk, and a third disk mounted within said recess between said second disk and said apertures in said polygonal portion, said third disk having at least one aperture therethrough, the apertures in said second and third disks being offset and said third disk being movable within said recess and engageable with said second disk to close the apertures therethrough under pressure of water entering said recess through said apertures in said polygonal portion.

3. In the structure according to claim 2, said third disk being formed of lightweight non-hygroscopic material.

4. A breather and drainage valve for use in watertight containers, comprising a hollow body member having means intermediate its ends for attachment to a watertight container with said body member extending vertically through the bottom wall of the container, said body member having apertures adjacent each end thereof for the passage of air and moisture therethrough, an apertured partition spanning the interior of said body member between the apertures therein, a filter in said body member above said partition and intercepting passage between the upper body and partition apertures, and a floating valve member in said body member between the lower of the body member apertures and said partition and normally spaced from said partition, said valve member being apertured in offset relation to said partition to close the passage through said partition when said valve member is raised against said partition by the pressure of water entering the lower of the body member apertures.

References Cited in the file of this patent

UNITED STATES PATENTS

| | | |
|---|---|---|
| 963,463 | Mueller | July 5, 1910 |
| 1,399,399 | Parson | Dec. 6, 1921 |
| 1,476,618 | Jones | Dec. 4, 1923 |
| 1,510,860 | Peck | Oct. 7, 1924 |
| 1,783,599 | Blake | Dec. 2, 1930 |
| 1,957,867 | Rike | May 8, 1934 |

FOREIGN PATENTS

| | | |
|---|---|---|
| 564,206 | Great Britain | 1944 |